March 5, 1929.　　　　G. F. WELLS　　　　1,704,270
ELECTRICAL COOKING DEVICE
Filed Oct. 18, 1927　　　　2 Sheets-Sheet 1
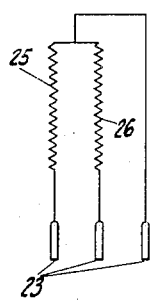
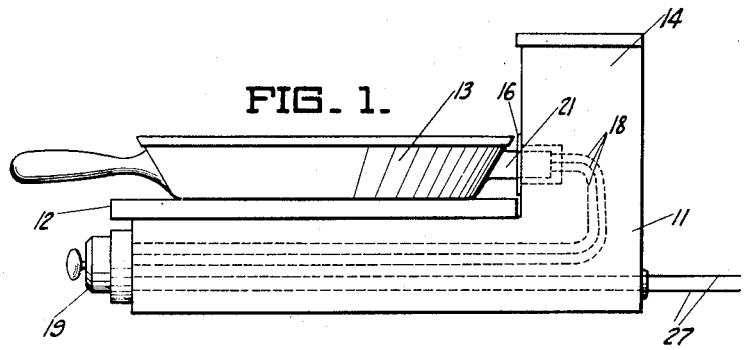
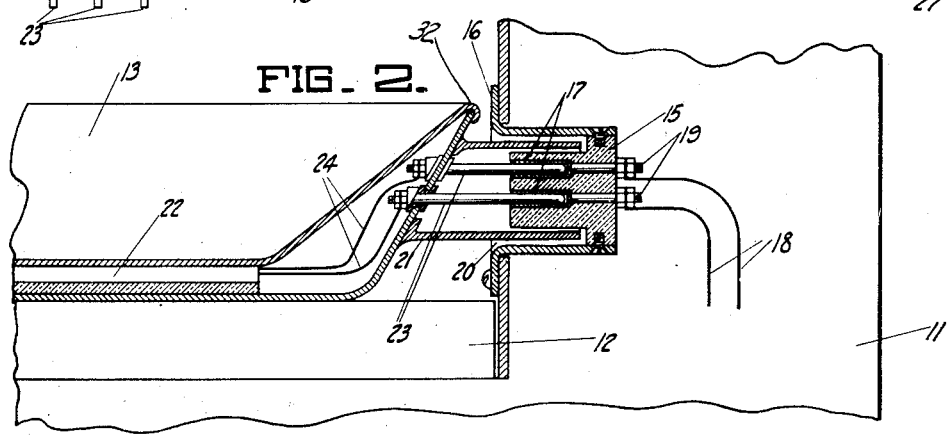
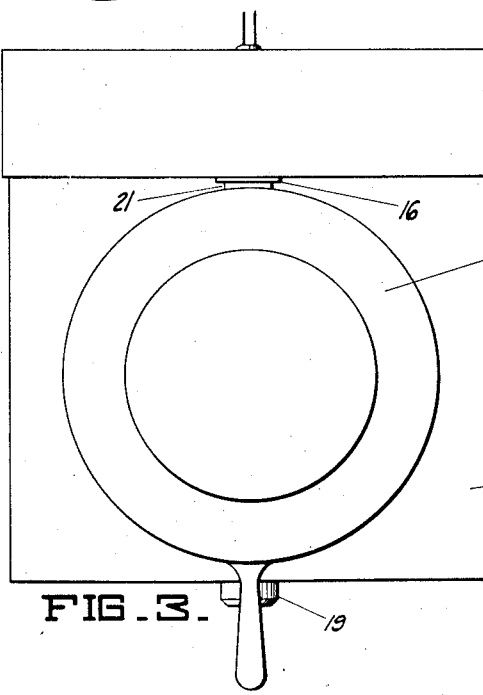
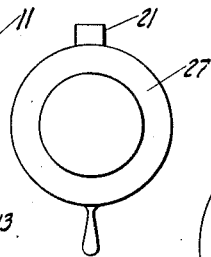
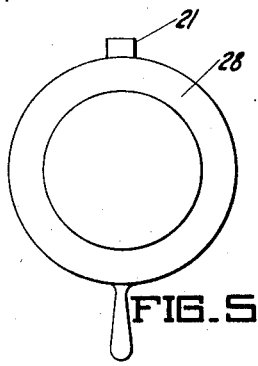
INVENTOR
George F. Wells
BY
John Flam
HIS ATTORNEY

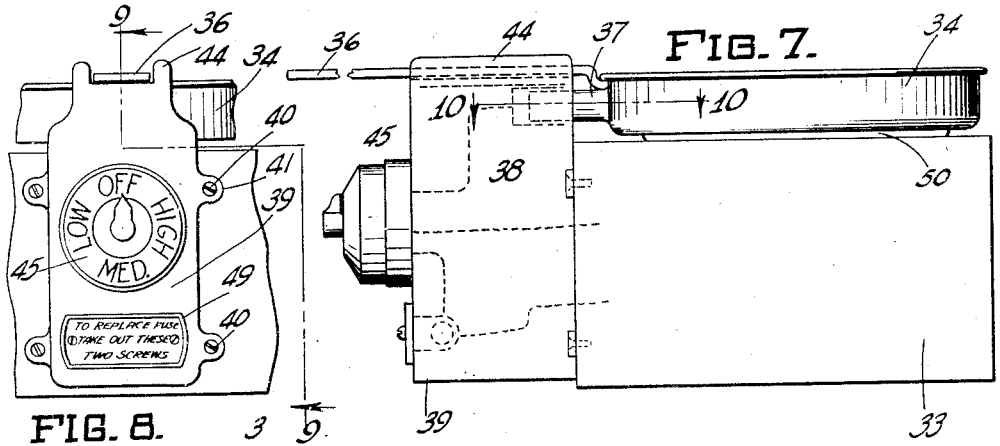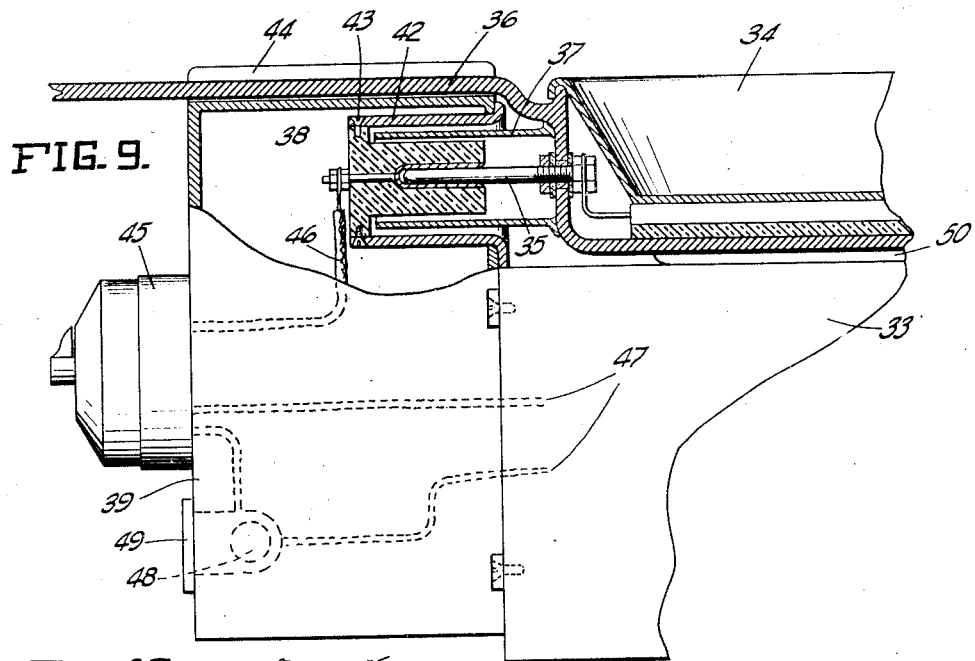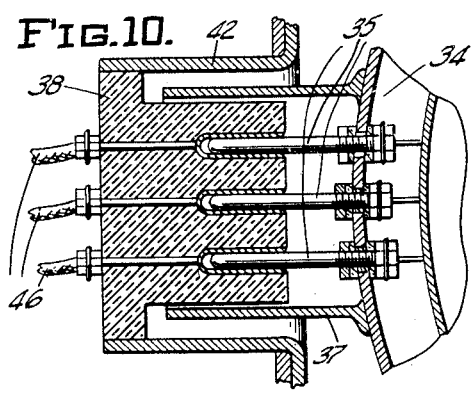

Patented Mar. 5, 1929.

1,704,270

UNITED STATES PATENT OFFICE.

GEORGE F. WELLS, OF SAN FRANCISCO, CALIFORNIA.

ELECTRICAL COOKING DEVICE.

Application filed October 18, 1927. Serial No. 226,927.

This invention relates to a device for cooking food by electricity, and especially to such a device that can be conveniently utilized in restaurants.

In restaurants, a large variety of food must of course be cooked; for example, to mention frying alone, steaks, chops, eggs, and potatoes. In many restaurants it is common to cook the food individually (or on "short order") for each patron; and this of course necessitates a large variety of cooking utensils, such as many sizes of frying pans or the like, that can be quickly heated to the desired temperature. It is primarily for this reason that either gas or electric ranges have been installed for this class of service.

It is one of the objects of my invention to provide electrical cooking utensils that can very conveniently be utilized in short order restaurants.

In order to accomplish this result, I arrange a table or pedestal upon which any one of a number of cooking utensils of varying sizes can be accommodated; and I provide a switching means supported by the pedestal that can control the heating of the utensil. It is accordingly another object of my invention to provide a structure that can be utilized in this way and yet capable of being easily kept clean and in proper working order.

My invention possesses many other advantages, and has other objects which may be made more easily apparent from a consideration of a few embodiments of my invention. For this purpose I have shown several forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawings:

Figure 1 is a side elevation of an electrical cooking device embodying my invention;

Fig. 2 is an enlarged detail sectional view of the same, showing how the connections are completed between the table and the cooking utensil;

Fig. 3 is a top plan view of the device shown in Fig. 1;

Figs. 4 and 5 show two different capacities of cooking utensils that can be utilized interchangeably in my device;

Fig. 6 is a wiring diagram of the heating units utilized in the utensils;

Fig. 7 is a side view of a modified form of my invention;

Fig. 8 is a fragmentary front view thereof;

Fig. 9 is an enlarged sectional view taken along plane 9—9 of Fig. 8; and

Fig. 10 is an enlarged sectional view, taken along plane 10—10 of Fig. 7.

In the first form of my invention, a table or pedestal 11 is provided with a top 12 that is made from heat resisting material that can be easily kept clean, such as insulation or Monel metal. The cooking utensil, such as a percolator or frying pan, can be accommodated on this top. In the present instance I show a double walled frying pan 13 disposed in position on the table 11. This frying pan is shown as electrically heated by the aid of an element 22 in good thermal contact with the inner wall of the pan, but heat insulated from the outer wall. The inner wall is rolled over to form an upper edge at 32 that is tight against the entry of foreign matter, such as water or grease.

The mode in which this heating element is energized forms one of the features of my invention. The table 11 has a vertical portion 14 in the inner wall of which there is a recess accommodating a socket or receptacle 15 (Fig. 2). This recess is formed by the aid of a tubular member 16 having a thin flange permitting it to be fastened to the portion 14. The socket 15 has a body of insulating material, but is provided with a plurality of spring tubes 17 of conducting material. These tubes are connected as by wires 18 and studs 19 to a control switch 19' conveniently located at the front edge of the table 11. It is to be noted that body 15 has a portion forming with tube 16 an annular space 20. Into this space, a tubular cover 21 can slide, which cover is fastened to the outer wall of utensil 13 and serves as a guard for prongs 23, as well as a guide to line up these prongs with the receptacle tubes 17. Tube 16 is purposely rounded at 31 to facilitate insertion of guard 21 therein by telescoping it into tube 16.

Prongs 23 are arranged to engage in tubes 17 as utensil 13 is moved into place, and as cover 21 telescopes into the tube 16. The heating element 22 is connected to the prongs 23, as by leads 24 located in the space between the double walls of the device 13. Prongs 23 are fastened in any appropriate manner to the outer wall, and in such a way as to be insulated therefrom.

Preferably the element 22 is one that can have its intensity of energization varied; and this can readily be accomplished by the aid of the switch 19 which can conveniently be in the form of a four pole snap switch. Thus for example, if the element 22 is wound in two sections 25 and 26 (Fig. 6) then by providing three prongs 23 and three cooperating socket tubes 17, it is possible by appropriate switching to have three degrees of heat. Thus for low heat, the left and center prongs 23 would be connected by switch 19 to the supply mains 27. In that case, the sections 25 and 26 would be connected directly in series. For medium heat, the right hand prong and any one of the others would be connected to the mains; and in that case, one section alone would receive the full voltage across the mains. For high heat, the left and center prongs would both connect to one of the mains, and the right hand prong to the other; in that case, both sections 25 and 26 would be connected in parallel across the mains.

The very same switch 19' can be used to control the heat for any one of a number of cooking utensils; thus for example, frying pans 27 and 28 (Figs. 4 and 5) can be provided of different sizes and can be utilized interchangeably with the socket 15.

The manner of use of the device is evident. When the cook receives an order, he chooses the right size and kind of utensil, plugs it in on table 11, and heats it up by turning switch 19 to "high" position. Then he can utilize any of the degrees of heat to perform his cooking operation. Since excellent thermal contact is possible between element 22 and the cooking utensil, it is seen that this scheme is especially well adapted for short orders. Due to the mechanical arrangement of the plug and receptacle, there is no danger of dirt or grease interfering with the connections.

In the modification shown in Figs. 7 to 10, there is a more compact arrangement for the connections. In this instance, the supporting table 33 can be covered over with metallic heat resisting material, such as Monel metal. The cooking utensil 34 is of similar construction to that of utensil 13, except that the prongs 35 for making the connections are located directly under the handle 36. In this way, this handle protects prongs and its guard tube 37 against injury. There is a pair of ribs 50 on the bottom of the pan for spacing it above the table 33, thereby providing an insulating air space. Furthermore, in order to cause engagement of these prongs with a receptacle such as 38 which is located in this instance at the front of table 33, in the wall of a box-like support 39, the pan 34 is moved forward.

This support 39 is fastened to the front of table 33, as by screws 40 that engage in the ears 41 on the support 39. The inner surface of this support has a recess that is above the level of the table 33, and that accommodates the receptacle 38. This recess is defined by the belled tube 42 into which guard tube 37 telescopes. Screws 43 hold the receptacle to the tube 42.

The support 39 also provides a guide formed between the two projecting bosses 44, for the handle 36; in this way, the movement of pan 34 forward to make the connections to prongs 35 is guided against lateral displacement. The support 39 also serves as a base for the four-way switch 45, from which leads 46 extend to the receptacle 38. The degree of heat can be varied in this form as in that first considered. The incoming lines 47 can extend to the switch 45 through table 33, one of the lines connecting through a fuse 48. This fuse can be held conveniently on a small cover plate 49 that is screwed to the front of the support 39.

The arrangement is compact; if there should be any necessity for inspecting the wiring or the like, the casing 39 can easily be removed by removing screws 40. The fuse replacement is also simple, involving as it does, the removal of cover 49. The table 33 can be made long to supply space for a number of utensils 34, as well as for a number of connection boxes 39.

I claim:

1. In a cooking system, a stand having an upper surface of heat resisting material as well as a wall extending above said surface, said wall having a recess, a plug receptacle in said recess having a body of insulation material spaced from the walls of the recess, an electrical cooking utensil, a plug rigidly fastened to said utensil and arranged to cooperate with the receptacle, and a guard extending around the plug and arranged to telescope into the recess.

2. In a cooking system, a stand having an upper surface of heat resisting material as well as a wall extending above said surface, said wall having a recess, a plug receptacle in said recess having a body of insulation material spaced from the walls of the recess, an electrical cooking utensil, a plug rigidly fastened to said utensil and arranged to cooperate with the receptacle, a guard extending around the plug and arranged to telescope into the recess, and a switch controlling the utensil and carried by the stand.

3. In combination, a double walled cooking utensil, the walls joining at an edge that is closed against the entry of foreign matter, a multiple heating unit in thermal conductive relation with the inner wall and out of conductive relation to the outer wall, and terminal connections mounted on the outer wall and so connected to the unit as to make it possible to vary its energization.

4. In a cooking system, a table, one or more supports adjacent the front edge of the table and having a projection above the table, a switch mounted on the outside of the support, and a receptacle in that part of the support which projects above the table, and arranged to face the table.

5. In a cooking system, a table, one or more supports fastened adjacent the front edge of the table and having a portion projecting above the table, said portion having a recess arranged toward the cable, a receptacle in said recess, a switch on said support, and connections between the receptacle and the switch.

6. In a cooking system, a table, a support adjacent the front edge of the table and projecting above it, said support having a recess toward the table, a receptacle in said recess, said support also having a groove in its upper surface, and an electrically heated cooking utensil having a handle for engaging the groove and resting on the table, said utensil also having connectors for engaging the receptacle.

7. In combination, a cooking utensil having a wide flat handle, a heating element for said utensil, and prongs extending externally of the utensil and beneath the handle for providing external connections for the element.

8. In combination, a table, a hollow box-like support detachably mounted at one edge of the table, said support having a portion projecting above the table top, a fuse inside said support, a switch on the outside of said support, a receptacle in a recess in the projecting portion of the support and adjacent the top of the table, and connections between the fuse, switch and receptacle.

9. In combination, a table, a hollow box-like support mounted at one edge of the table, said support having a portion projecting above the table top, and a receptacle in said portion, said support having a groove in its upper surface to accommodate the handle of a cooking utensil.

10. In combination, a table, a support mounted at one edge of the table, and a receptacle on said support, said support having a groove in its upper surface to accommodate the handle of a cooking utensil.

In testimony whereof I have hereunto set my hand.

GEORGE F. WELLS.